(12) United States Patent
Bruun et al.

(10) Patent No.: US 11,171,841 B2
(45) Date of Patent: Nov. 9, 2021

(54) SYSTEM FOR PROPAGATING A MODIFICATION OF A FIRST SERVICE, IN A SERVICE GRAPH, TO A SECOND SERVICE

(71) Applicant: HEWLETT PACKARD ENTERPRISE DEVELOPMENT LP, Houston, TX (US)

(72) Inventors: Peter Michael Bruun, Alleroed (DK); Thomas Mortensen, Alleroed (DK); Jens Vedel Markussen, Alleroed (DK)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/751,742

(22) PCT Filed: Jan. 28, 2016

(86) PCT No.: PCT/EP2016/051851
§ 371 (c)(1),
(2) Date: Feb. 9, 2018

(87) PCT Pub. No.: WO2017/129248
PCT Pub. Date: Aug. 3, 2017

(65) Prior Publication Data
US 2018/0234308 A1 Aug. 16, 2018

(51) Int. Cl.
*H04L 12/24* (2006.01)
*H04L 12/26* (2006.01)
(Continued)

(52) U.S. Cl.
CPC ........ *H04L 41/5025* (2013.01); *G06F 9/5072* (2013.01); *G06F 9/5077* (2013.01);
(Continued)

(58) Field of Classification Search
CPC .......... G06F 8/75; G06F 9/5083; G06F 11/30; G06F 13/00; G06F 15/173; G06F 9/50;
(Continued)

(56) References Cited

U.S. PATENT DOCUMENTS 7,111,299 B2   9/2006   Tran et al.
7,950,007 B2   5/2011   Mohindra et al.
(Continued)

FOREIGN PATENT DOCUMENTS

CN   1942860 A    4/2007
CN   101933000 A  12/2010
(Continued)

OTHER PUBLICATIONS

Oracle, "4 Understanding Orchestration," Oracle (Registered) Communications Order and Service Management Concepts, 2009, pp. 1-55, Release 7.2.2, Retrieved from the Internet on Nov. 24, 2017 at URL: <docs.oracle.com/cd/E35413_01/doc.722/e35415/cpt_orchestration.htm#autoId0>.
(Continued)

*Primary Examiner* — Robert B Harrell
(74) *Attorney, Agent, or Firm* — Hewlett Packard Enterprise Patent Department

(57) ABSTRACT

Examples of an apparatus and method for propagating a modification to a service graph are described herein. Relationships between services in the service graph are identified in response to a modification to a service. The relationship is a reference between pairs of services in the service graph. Based on the identified relationships, a modification is propagated.

19 Claims, 7 Drawing Sheets

(51) Int. Cl.
*G06F 9/50* (2006.01)
*H04L 29/08* (2006.01)

(52) U.S. Cl.
CPC ...... *H04L 41/0816* (2013.01); *H04L 41/0893* (2013.01); *H04L 41/12* (2013.01); *H04L 41/5054* (2013.01); *H04L 43/0817* (2013.01); *H04L 67/1097* (2013.01)

(58) Field of Classification Search
CPC ..... G06F 9/5072; G06F 9/5077; H04L 29/06; H04L 29/08; H04L 29/0809; H04L 29/08072; H04L 29/08135; H04L 29/08144; H04L 41/12; H04L 41/22; H04L 41/0213; H04L 41/5009; H04L 41/5054; H04L 67/32; H04L 67/34; H04L 12/24; H04L 12/26; H04L 41/816; H04L 41/893; H04L 41/5025; H04L 43/0817; H04L 67/1097
USPC ................................................ 709/201, 223
See application file for complete search history.

(56) References Cited

U.S. PATENT DOCUMENTS

| | | |
|---|---|---|
| 8,191,043 B2 | 5/2012 | Mohindra et al. |
| 8,245,122 B2 | 8/2012 | Liu et al. |
| 8,301,755 B2 | 10/2012 | De Pouter et al. |
| 8,418,002 B2 | 4/2013 | Lazzaro |
| 8,863,137 B2 | 10/2014 | Keller et al. |
| 8,880,591 B2 | 11/2014 | Feldman et al. |
| 8,914,499 B2 | 12/2014 | Houlihan et al. |
| 8,954,418 B2 | 2/2015 | Faerber et al. |
| 9,286,106 B1 | 3/2016 | Huang |
| 9,367,374 B2 | 6/2016 | Kaus et al. |
| 9,378,120 B2 | 6/2016 | Chakraborty et al. |
| 9,430,262 B1 | 8/2016 | Felstaine et al. |
| 9,594,601 B2 | 3/2017 | Shau et al. |
| 9,998,562 B1 * | 6/2018 | Peterson ................ H04L 67/32 |
| 10,178,027 B2 | 1/2019 | Johnsen et al. |
| 10,275,258 B2 | 4/2019 | Zellermayer et al. |
| 10,326,845 B1 | 6/2019 | Jaeger |
| 10,348,857 B2 | 7/2019 | De et al. |
| 10,419,524 B2 | 9/2019 | Schincariol et al. |
| 10,454,771 B2 | 10/2019 | Ellis et al. |
| 10,594,621 B2 | 3/2020 | Sharma et al. |
| 10,785,128 B1 | 9/2020 | Bawcom |
| 2004/0260602 A1 | 12/2004 | Nakaminami et al. |
| 2005/0086562 A1 | 4/2005 | Demsky et al. |
| 2005/0155042 A1 | 7/2005 | Kolb et al. |
| 2005/0240354 A1 | 10/2005 | Mamou et al. |
| 2006/0029054 A1 | 2/2006 | Breh et al. |
| 2006/0256733 A1 | 11/2006 | Bejerano |
| 2006/0268742 A1 | 11/2006 | Chu et al. |
| 2007/0043803 A1 | 2/2007 | Whitehouse et al. |
| 2007/0294668 A1 | 12/2007 | Mohindra et al. |
| 2008/0294777 A1 | 11/2008 | Karve et al. |
| 2009/0157723 A1 | 6/2009 | De Peuter et al. |
| 2009/0193439 A1 | 7/2009 | Bernebeu-Auban et al. |
| 2009/0327216 A1 | 12/2009 | Brown et al. |
| 2010/0057780 A1 | 3/2010 | Isobe et al. |
| 2010/0333109 A1 | 12/2010 | Milnor |
| 2011/0046992 A1 | 2/2011 | Erhard |
| 2011/0145657 A1 | 6/2011 | Bishop et al. |
| 2011/0276444 A1 * | 11/2011 | Tornkvist ............ H04L 12/1471 705/32 |
| 2012/0016713 A1 | 1/2012 | Wilcock et al. |
| 2012/0089726 A1 | 4/2012 | Doddavula |
| 2012/0117226 A1 | 5/2012 | Tanaka et al. |
| 2013/0036425 A1 | 2/2013 | Zimmermann |
| 2013/0127891 A1 | 5/2013 | Kim et al. |
| 2013/0151317 A1 | 6/2013 | Charfi et al. |
| 2013/0198760 A1 | 8/2013 | Cuadra et al. |
| 2013/0217361 A1 | 8/2013 | Mohammed et al. |
| 2013/0290937 A1 | 10/2013 | Joukov et al. |
| 2014/0013315 A1 | 1/2014 | Genevski et al. |
| 2014/0074905 A1 | 3/2014 | Schincariol et al. |
| 2014/0075048 A1 | 3/2014 | Yuksel et al. |
| 2014/0098673 A1 | 4/2014 | Lee et al. |
| 2014/0172944 A1 | 6/2014 | Newton et al. |
| 2014/0229945 A1 | 8/2014 | Barkai et al. |
| 2014/0278662 A1 | 9/2014 | Reed et al. |
| 2015/0006733 A1 | 1/2015 | Khan et al. |
| 2015/0120380 A1 | 4/2015 | Deshpande et al. |
| 2015/0124645 A1 * | 5/2015 | Yadav ................ H04L 41/5048 370/254 |
| 2015/0278395 A1 | 10/2015 | Ben et al. |
| 2015/0309780 A1 | 10/2015 | Ruehl et al. |
| 2015/0365322 A1 | 12/2015 | Shatzkamer et al. |
| 2015/0378774 A1 | 12/2015 | Vermeulen |
| 2016/0080422 A1 | 3/2016 | Belgodere et al. |
| 2016/0094477 A1 | 3/2016 | Bai et al. |
| 2016/0378450 A1 | 12/2016 | Fu et al. |
| 2017/0161104 A1 | 6/2017 | Johnson et al. |
| 2017/0161129 A1 | 6/2017 | Johnson et al. |
| 2017/0207968 A1 | 7/2017 | Eicken et al. |
| 2017/0257432 A1 | 9/2017 | Fu et al. |
| 2017/0270214 A1 | 9/2017 | Narasimhan et al. |
| 2017/0289060 A1 | 10/2017 | Aftab et al. |
| 2017/0322954 A1 | 11/2017 | Horowitz et al. |
| 2017/0366623 A1 | 12/2017 | Shi et al. |
| 2018/0083828 A1 | 3/2018 | Cartaya et al. |
| 2018/0107186 A1 | 4/2018 | Brown et al. |
| 2018/0145884 A1 | 5/2018 | Stefanov et al. |
| 2018/0157472 A1 | 6/2018 | Chen |
| 2018/0165071 A1 | 6/2018 | Raghavan et al. |
| 2018/0246755 A1 | 8/2018 | Ailamaki et al. |
| 2018/0359162 A1 | 12/2018 | Savov et al. |
| 2019/0058638 A1 | 2/2019 | Ahuja et al. |
| 2019/0068440 A1 | 2/2019 | Nelson |

FOREIGN PATENT DOCUMENTS

| | | |
|---|---|---|
| CN | 102138315 A | 7/2011 |
| CN | 103516781 A | 1/2014 |
| CN | 104901998 A | 9/2015 |
| CN | 105164660 A | 12/2015 |
| WO | 2007/146368 A2 | 12/2007 |
| WO | WO-2008091663 A1 | 7/2008 |
| WO | WO-2015032435 A | 3/2015 |
| WO | 2017/129248 A1 | 8/2017 |

OTHER PUBLICATIONS

Office Action received for European Patent Application No. 14790011.2, dated Apr. 10, 2018, 5 pages.
Office Action received for European Patent Application No. 14790011.2, dated Aug. 3, 2018, 4 pages.
Kelly et al., "Output-Valid Rollback-Recovery", HP Labs, HPL-2010-155, 2010, pp. 1-14.
International Searching Authority, "Notification of Transmittal of the International Serach Report and The Written Opinion", PCT/EP2014/070838, dated Jun. 15, 2015, 12 pages.
International Preliminary Report on Patentabilityreceived for PCT Application No. PCT/EP2014/070838, dated Apr. 13, 2017, 10 pages.
International Preliminary Report on Patentability received for PCT Patent Application No. PCT/EP2016/051851, dated Aug. 9, 2018, 8 pages.
Intel, "End-to-End NFV vEPC Service Orchestration of a Virtual EPC Network Function Virtualization Use Case on Intel Architecture", Intel Network Builders Reference Architecture Retreived on Mar. 26, 2017, 24 pages.
Ferry et al., "A Real-time Scheduling Service for Parallel Tasks", IEEE 19th Real-Time and Embedded Technology and Applications Symposium (RTAS), Apr. 2013, 11 pages.
Clayman, et al., "The Dynamic Placement of Virtual Network Functions", Telecom Italia Strategy Future Centre. Via Reiss Romoli 274, 10148 Turin, Italy. IEEE 2014, 9 pages.

(56) References Cited

OTHER PUBLICATIONS

Cerrato, et al., "User-Specific Network Service Functions in an SDN-Enabled Network Node", Deptment of Computer and Control Engineering. Politecnico di Torino. Torino, Italy, 2014, 2 pages.
Xiao et al., "Process Dependencies and Process Interference Rules for Analyzing the Impact of Failure in a Service Composition Environment", Proceedings of the 10th international conference on Business information systems, 2007, pp. 67-81.
Laurent et al., "Planning for Declarative Processes", The 29th Annual ACM Symposium on Applied Computing, 2014, pp. 1126-1133.
Bohm et aL, "Processes Are Data: a Programming Model for Distributed Applications", Web Information Systems Engineering - Wise 2009, 12 pp.
Fdhila Walid et al., "On Evolving Partitioned Web Service Orchestrations," IEEE International Conference on Service-Oriented Computing and Applications, Dec. 2012, pp. 1-7.
International Search Report and Written Opinion, International Application No. PCT/EP2016/051851, dated Oct. 10, 2016, pp. 1-10, EPO.
Yang et al., "Research on Software Architecture-based Composition of Internetware", May 15, 2007, 3 pages.
Casati et al., "eFlow: A Platform for Developing and Managing Composite E-Services", Proceedings Academia/Industry Working Conference on Research Challenges, 2000, pp. 341-348.

\* cited by examiner

SYSTEM FOR PROPAGATING A MODIFICATION OF A FIRST SERVICE, IN A SERVICE GRAPH, TO A SECOND SERVICE

BACKGROUND

Provisioning services according to users' specifications is a complex task. Approaches such as service decomposition allow services to be understood in terms of their dependencies on other services. Across a service provider's network, services form a service graph which is representative of the dependencies between services. If a service is modified it can lead to a disruption of dependent services unless the effect of the modification is propagated to other dependent services identified in the service graph.

BRIEF DESCRIPTION OF THE DRAWINGS

Various features of the present disclosure with the apparent from the detailed description which follows, taken in conjunction with the accompanying drawings, which together illustrate, by way of example, features of the present disclosure, and wherein.

DETAILED DESCRIPTION

Figure 1:
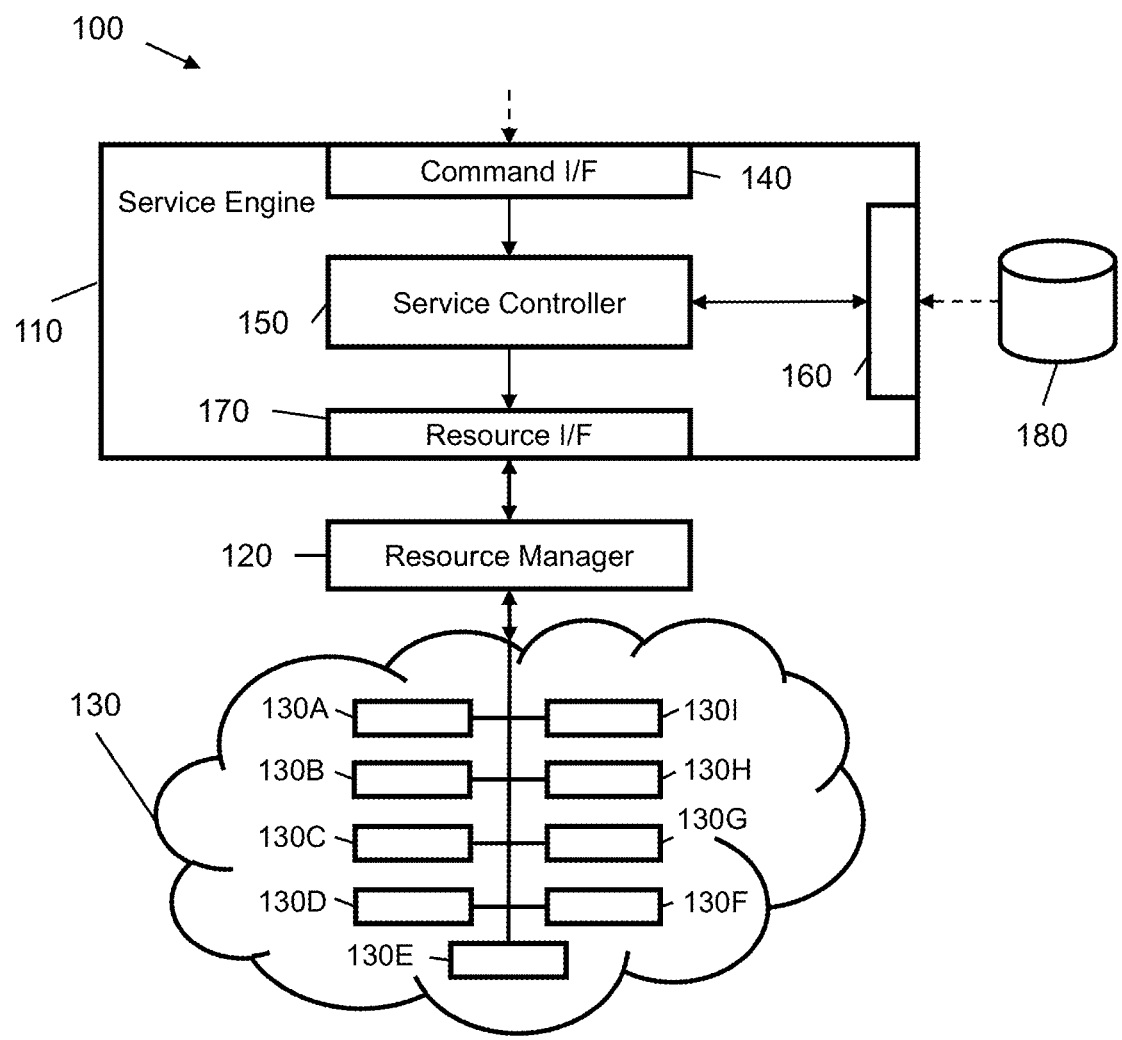
FIG. 1 is a schematic diagram showing a service engine for creating or modifying a service according to an example.

In the following description, for purposes of explanation, numerous specific details of certain examples are set forth. Reference in the specification to "an example" or similar language means that a particular feature, structure, or characteristic described in connection with the example is included in at least that one example, not necessarily in other examples.

Certain examples described herein provide measures for propagating modifications to services represented in a service graph. A service graph comprises a collection of services, subservices and physical or virtual components used to construct those services. In particular, the service graph defines relationships between those services and subservices, represented as an acyclic directed graph. In the present context, a "graph" is a collection of nodes representing services and arcs representing relationships between the services. A graph may include many types of nodes and arcs.

In some examples a service is described through the use of a descriptor. A "descriptor" or "service descriptor" is a date type which is used to describe a type of service and roles governing the service. A descriptor comprises one or more parameters which define policies to implement the service and is provided in a data type in a format understandable to a service controller or service orchestra for such that the service controller can instantiate, modify and delete the service specified in the descriptor according to the policies. When the service is instantiated, parameters define various attributes of the service. Service descriptors provide a convenient, modular description of services in terms of the types of subservices, physical and/or virtual functions, physical and/or virtual network components, and specific infrastructure components such as physical or virtual storage, networking facilities end computing resources and the rules governing those components to instantiate, modify or delete a particular service. In certain examples described herein, descriptors are used to declaratively define one or more desired parameters of a service in terms of other parameters, subcomponents and also the relations between the service and other services provided by the service provider. In some examples, the underlying virtual resources provided by a service provider are virtual network functions (VNF) managed by a VNF management system. A VNF management system can provide the capabilities for creating virtual machines (VMs) or connecting virtual Network Interface Cards (vNICs) for example. In certain examples, a highly complex arrangement of a very large number of such components is used to implement a service. The service descriptor provides a way of breaking down a complex service into composable subservices which each have their own descriptors. Instantiations of services decompose into hierarchies of parent and child services where, for example, individual components instantiated by a service controller such as a VNF management system are represented at the lowest level of the hierarchy. In particular, descriptors provide a construct which abstracts much of the configuration of underlying physical/virtual components but which is used to define the types of entities used to orchestrate those components to instantiate, modify or delete the service using decomposition.

In some examples a service request from a user or in other cases, non-users such as external systems or human non-users such as administrators, comprises one or more services which fall outside of the services offered by a service provider. However, the service provider has the capability in the underlying physical or virtual infrastructure to fulfill the request and may wish to do so. For example, if a user requests a shared storage facility which was a service instantiated by the service provider in response to a request of another user, the service descriptor of the requested service may include a reference to the shared storage service. One or more parameters of the requested service define how attributes of the service are to be computed. These attributes depend on the attributes of the referenced shared storage service. Attributes of the requested service are re-computed based on the parameters in the descriptor of the requested service, in response to a modification to attributes of the shared storage service. In some examples, the service request specifies that the storage service additionally be configured to be compatible with the other subservices which form their service request. This can be included in the service descriptor as part of the specification of one or more parameters. Similarly the requesting service can be represented in the service descriptor of the shared storage service as one or more referring parameters. For example, one attribute of the shared storage service is the capacity being used by a user service which refers to the shared storage service. If the attribute changes at the user's service referring to the shared storage service, one or more attributes of the shared storage service may need to be recomputed to propagate the attribute changed in response to the user's request. Furthermore the other services using the shared storage service will have attributes which depend on the attributes of the shared storage service. Hence, changes may be propagated to other attributes of services in the service graph.

In another example, a change in the attribute of a service occurs due to events other than external user requests. In an example, periodic upgrades and monitoring events trigger a reconfiguration of a service attribute. Similarly, if that service depends on one or more other services, those other services may also be affected by the change to that attribute. In one case, an attribute of a service is modified in response to an alert from a fault monitoring system or as part of a service monitoring system measuring performance of services on the provider's networks.

The services collectively describe a service graph. The service graph comprises the relationships between different services and subservices of those services. In some examples, nodes of the service graph are services or subservices which correspond to entities instantiated on a service provider's physical and/or virtual infrastructure which have one or more inter-relations with one another in the manner described above according to the descriptors of the services. In a simple hierarchical service structure, the service graph is an acyclic directed tree comprising parent and child services. However, in general, where services form complex inter-relationships comprising referencing and referenced services the service graph forms an arbitrary directed graph. When a service request for a new service is received by the service provider, the service provider or the system reviews existing services which are currently provisioned on their infrastructure and in response, activates the entities for providing the service to that user. In some examples, the service is instantiated from existing components and subservices to fulfill the request.

To remain competitive, service providers have to guarantee a minimum availability to their customers. In particular the requirements for guaranteeing services may be 99.999% availability (or higher). Guaranteeing that level of availability depends on the ability of the provider to reconfigure their systems in response to changes. Fulfillment of a service change has a knock-on effect through the provider's infrastructure resulting in reconfiguration. One option would be to tear down existing instantiations of services and recreate those services. However, this solution may involve an unacceptable level of downtime for customers. In other examples, the service provider may wish to reconfigure their own infrastructure, for example as part of a routine upgrade. In such a case it is not sufficient to take services offline throughout the upgrade.

In a general case, a potentially large number of changes to other services may be made in order to propagate a modification to a service throughout a service graph. In the example given previously of a shared storage facility, if that facility is referenced by a large number of services, any alteration to the shared storage will trigger a potentially large number of disruptions to users.

FIG. 1 is a simplified schematic diagram of an apparatus 100 for configuring a service according to an example. The apparatus 100 shown in FIG. 1 comprises a service engine 110. In the example shown in FIG. 1, the service engine 110 is arranged to access service descriptors and send instructions to a resource manager according to the descriptors. More specifically, in response to a modification to an attribute of a service, the service engine 110 can generate instructions which are sent to a resource manager 120, to reconfigure a physical and/or virtual infrastructure 130.

The physical and/or virtual infrastructure 130 is configured to implement instances of services according to the parameters in descriptors associated to those services. In this context, "reconfiguring" the physical and/or virtual infrastructure 130 means generating, modifying and/or deleting infrastructure components. In general, a request received at the service engine 110 is a request to modify a particular service, however in this context being responsive to a request to modify a service does not necessarily mean that the service engine 110 is generating instructions to modify the physical or virtual infrastructure which is implementing an instance of that particular service. As that service may be one of a number of services being implemented on the physical and/or virtual infrastructure 130, and, as previously deserved, utilizing those other services, the instructions sent to resource manager 120 to reconfigure the physical and/or virtual infrastructure 130 may relate to any number of other services represented in the service graph. It may even be the case that a request to modify a service comprises a request for a new additional subservice, not currently being implemented (and therefore not represented in the service graph), in which case the instructions comprise a request to reconfigure the resources to implement a new subservice instance. In another case, a service is modified as a result of a trigger, due to a fault monitoring event, timing event or a state-transition event of a service.

The service engine 110 of FIG. 1 comprises a command interface (I/F) 140, a service controller 150, a storage interface 160 and a resource interface 170. The service engine 110 is connected via the resource interface 170 to the resource manager 120 which is communicatively coupled to the underlying physical and/or virtual infrastructure 130. The service controller 150 is communicatively coupled to the command interface 140 and is arranged to access descriptors of one or more services in response to a request received at the command interface 140. In some examples this is a request, e.g. based on a communications protocol, to create, modify or delete a service. In other examples it is a command from a graphical user interface and/or a programmatic interface. The service controller 150 is configured to be responsive to an indication of a modification to an attribute of service instance received at the resource interface 170. In an example, a fault in a resource in the physical and/or virtual infrastructure sends an indication to the service controller 150 that the service instance has been disrupted. In a further example, the service controller 150 is responsive to one or more external devices identified through the resource interface 170.

The service controller 150 in response to data received at the resource interface 170 or command interface 140 accesses descriptors of services stored in a service descriptor data store 180 via the storage interface 160. The data store 180 comprises descriptors of services, subservices and components which collectively form those services and is, according to one example, a remote storage device maintained by a third party. In another example the data store 180 is directly accessible to the service engine 110.

In one case, the service controller 150 is arranged to identify, one or more parameters defining subservices of the service and parameters relating to other services, in the descriptor of the service. For example, the service controller 150 initially accesses the service descriptor of the affected service. On identifying one or more changed attributes of the service, the service controller 150 is arranged to access descriptors of those services referencing the affected service and also those services which the affected service references. Descriptors of the referencing services contain parameters which define how attributes of those services are computed based on attributes of the affected service (and potentially, attributes of other services). The service controller 150 is arranged to re-compute attributes of the services referencing the affected service and instruct the resource manager 120 to instantiate, modify or delete the other services according to the recomputed attributes.

The service controller 150 propagates changes to the service graph in response to modifications to a service, on identifying a relationship between a pair of services by propagating a change to an attribute identified by a parameter in the descriptors of either one of the services. In some examples, propagation of the affected attributes comprises the service controller 150 generating an instruction to be sent to the resource manager 120 to reconfigure the physical and/or virtual computing resources via the resource interface 170 to instantiate the change. In an example, "reconfiguring" or "reassigning" physical and/or virtual computing resources comprises a change such as a simple setting, for example, a modification to the bandwidth used by a service.

In an example, with reference to FIG. 1, the command interface 140 is arranged to receive a request via a graphical user interface (GUI). In some examples, a user or group of users is able to access the GUI and input their requests for services via the GUI. In particular, a service provider of the apparatus 100 is able to provide a catalogue of services which it currently implements on its physical and/or virtual infrastructure 130. In examples, the GUI also enables specifying a service according to a user's own preference allowing services not currently implemented on the infrastructure 130 to be requested. In alternative examples, the command interface 140 also accepts requests from a multitude of sources including the resource provider. For example, in one case a request is provided by an operations support system in response to an automated monitoring activity or as part of a system-wide upgrade. In some examples, a service provider configures the IP stack across their network(s). In a further example, a user is shown a graphical representation of the service graph. This shows relationships between the various services currently operational on the service provider's infrastructure and provide the user with a way to graphically select a service to their own requirement(s). In some examples attribute values of parameters associated to the services are presented to the user so that they can select a service according to their own specification.

FIG. 1 shows the service engine 110 communicatively coupled to resource manager 120. Resource manager 120 is arranged to configure resources in the physical and/or virtual infrastructure 130 on receipt of a command from the resource interface 170. In an example, the physical and/or virtual infrastructure 130 comprises a combination of physical and/or virtual computing, storage and networking resources. In an example, the physical and/or virtual infrastructure comprises one or more of switches 130A, routers 130B, firewalls 130C, load balancers 130D, hypervisors 130E, infrastructure management systems 130F, controllers 130G, network management systems 130H and inventory systems 130I. In the case of virtual resources, it should be noted that the instructions received from the resource manager are passed to a virtualization manager executed in the physical and/or virtual infrastructure 130, which explicitly manages the virtualization components. For example, in one case, instructions to create specific virtual components such as VMs or vNICs are generated in the physical and/or virtual infrastructure 130 directly in response to instructions received from the resource manager 120, as opposed to the service engine accessing descriptors for components specifying individual components such as VMs. However, the latter case is also possible and the resource manager 120 performs one or more functions equivalent to a virtualization manager if the service provider wishes to provide those services to users. In an example, the resource manager 120 has access to one or more storage entities which provide a mapping between instructions received from the service engine 110 and instructions to send to the physical and/or virtual infrastructure 130 for instantiating, modifying or deleting specific physical and/or virtual infrastructure components.

Figure 2:
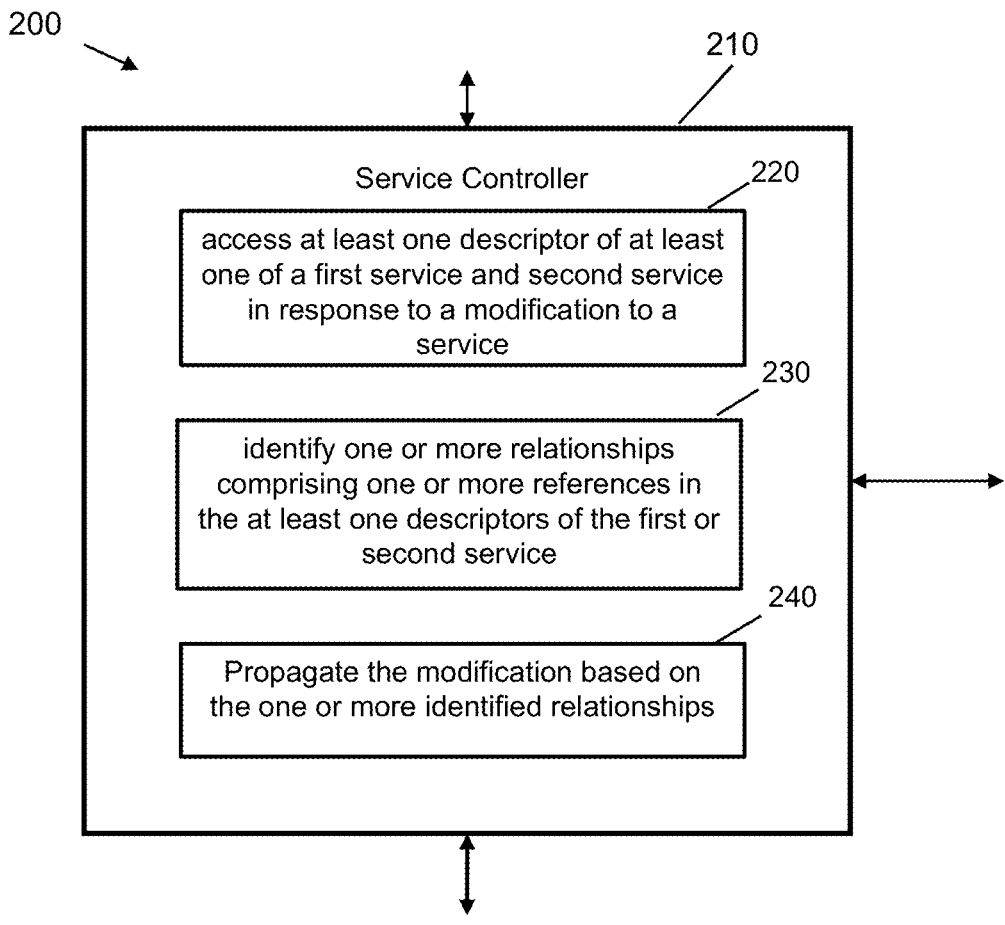
FIG. 2 is a schematic diagram showing a service controller according to an example.

FIG. 2 is a simplified schematic diagram of an apparatus 200 showing a service controller 210 according to an example. The service controller 210 is arranged to, in response to a modification to a service in a service graph comprising at least a first service, access at least one descriptor of at least one of the first service and a second service 220, identify one or more references in the one or more descriptors of the first or second service 230, wherein the one or more references comprise at least one of a reference in a descriptor of the first service to the second service, and a reference in a descriptor of the second service to the first service, and propagate the modification based on the one or more identified relationships 240. In an example, the service controller 210 shown in FIG. 2 is used in conjunction with the apparatus shown in FIG. 1.

Figure 3A:
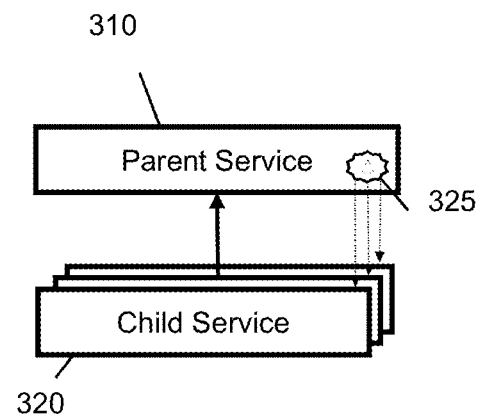
FIG. 3A is a schematic diagram showing attribute passing from a parent service to one or more child services according to an example.

FIG. 3A is a schematic illustration showing a parent service 310 and a number of child services 320. As previously described, a service may be decomposed in to a number of subservices which themselves decompose into subservices all the way down to the individual components of a computing resource in the provider infrastructure. This decomposition process is described as a "parent/child decomposition chain". The descriptor of the parent service 310 describes one or more parameters which define policies to instantiate, modify or delete the child services 320 according to the attribute values of those parameters by, for example, the service controller 150 shown in FIG. 1. According to an example some of the attributes of the child services 320 are "inherited" attributes. These are attributes of the child services 320 which depend on one or more attributes of the parent service. In FIG. 3A an attribute of the parent service has been modified (represented in FIG. 3A by the "delta" ($\Delta$) symbol 325). FIG. 3A shows the propagation of the modified attribute $\Delta$ to the child services 320. According to an example, one or more parameters in the descriptors of child services are identified for computation of the attributes of the child services. The service controller 150 is arranged to parse the descriptors of the child services 320 and re-compute the attributes of the child services 320 based on the value of modified attribute 325. The service controller 150 is arranged to pass instructions to the resource manager 120 to reconfigure the virtual/physical infrastructure 130 to instantiate, modify or delete the child services 320 with the modified attributes.

In an example in the context of virtual networking, a descriptor of a vrouter (a software function replicating the hardware-based Layer 3 IP routing) defines a wide area network (WAN)-facing network parameter and a local area network (LAN)-facing network parameter. A specific implementation of that vrouter type, e.g. a descriptor for a specific virtual router, then defines which one of its child virtual NICs is WAN-facing and LAN-facing and passes the parameters on to those relevant vNICs as inherited attributes. Following generation, one or more of the attributes in the descriptor of the parent service are modified. Responsive the modification, the service controller 150 can identify the relevant child services and instruct the resource manager 120 to instantiate the modification according to the updated attributes of the child services.

Figure 3B:
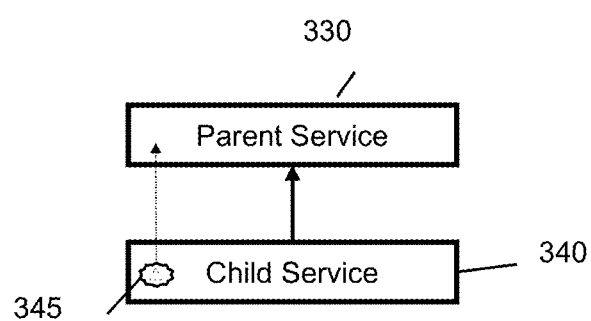
FIG. 3B is a schematic diagram showing attribute passing from a child service to a parent service according to an example.

FIG. 3B is a schematic illustration showing an alternative example in which attributes of a parent service 330 depend on one or more attributes of a child service 340. In this case, the descriptor of the parent service 330 contains a "child-.parameter" which specifies how attributes of the parent service are computed from attributes of the child service. In FIG. 3B attribute 345 of the child service 340 is changed. In response the "child.parameter" in the parent service 330 are recomputed taking into account the modified attribute 345. The modified attribute 345 of the child service 340 is due to, for example a request received via the command interface 140 or in response to one or more triggers received at the resource interface 170, in response to a monitoring or fault checking process or as a result of a state-change, for example, the service may be decommissioned by the provider. In an example, a user is able to request specific attributes for the child service 340 as part of a service request.

In another example, attributes of one or more child services are subject to modification by the service provider or any other entity arranged to send requests to the service controller 150 via command interface 140. In this case, the service controller 150 is arranged to instruct the resource manager to instantiate, modify or delete the child service according to the modified attributes as a result of the request. The "child.parameter" specified in the descriptor of the parent service can be identified by the service controller 150 which can instruct the resource manager to use the updated child service in accordance with the request. Hence, the child.parameter specifies a way to propagate a change in the child service 340 in response to the request to the parent service 330. In the example of a vRouter previously given, each child vNIC is separately configurable as a subservice. A user may request that the first vNIC is no longer a WAN-facing vNIC but is now instead a LAN-facing vNIC, for example due to a change in the underlying network configuration. By specifying that this parameter is a child parameter in the descriptor of the parent vRouter, attributes of the parent service can seamlessly be updated to reflect the request.

In an implementation of the service engine 110, it is possible to detect when changes of attributes have occurred in the parent-child hierarchy. In particular, there is no need to specify separate code to compare previous values of one attribute. In an example, the apparatus 100 is arranged to access a descriptor of a parent service and identify one or more attributes depending on a child service of the parent service. The service controller 150 is arranged to recompute the identified attributes and instantiate, modify or delete the parent service based on the descriptor with the updated attribute values.

Figure 3C:
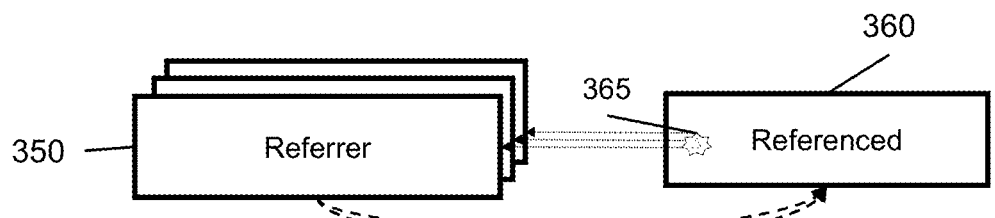
FIG. 3C is a schematic diagram showing a first service referring to a second service according to an example.

FIG. 3C shows a schematic diagram of a number of services 350 referencing a service 360 according to an example. A reference is defined by data in the descriptor data structure representing the referrer entity. In general, the service controller 150 is responsive to references appearing in the service descriptor of a service. A service descriptor contains a reference of the form:

reference:
type: [entity type]
constant: [$entity].

The above notation is pseudo-code for identifying a reference service in the descriptor of the referring service. When the service controller 150 parses a request from the command interface 140 to generate an instance of the first service, the above reference will trigger the service controller to identify a descriptor of the reference in the data store 180 and generate instructions to be sent via the resource interface 170 to the resource manager 120, to generate an instance of the reference according to the entity specified in the "entity type". In the notation above, "type" defines the entity type ("[entity type]") to be used as a value for the reference, which is a reference to a name of a descriptor or a class of descriptors for the type of entity that the reference parameter may hold as a value and "constant" defines an entity to be passed to a function to obtain an entity of the defined type.

Services and their reference services, in general, do not exist in isolation and thus it is not sufficient to merely tear down the existing service and the corresponding referenced services used in response to a request to modify the service from a user. For example, where a user has requested an instance of a shared storage service, that service may be being referenced by a number of other services. A service engine such as the example service engine 110 shown in FIG. 1 needs a way to identify modifications to parameters in the descriptor of the referenced service as a result of a request and responding to those changes in the instantiations of the referrer services. For example, in the case of a shared storage service, the user who initially generated the service may now request to reduce the capacity of the storage service.

In FIG. 3C, services 350 referencing service 360 are defined by one or more descriptors. In the example of a service engine 110 shown in FIG. 1, the service controller 150 modifies an attribute of the service 360 referenced by services 350. Initially, the service controller instructs the resource manager 120 via the resource interface to modify or delete an instantiation on the physical and/or virtual infrastructure 130. However, additionally, the service controller can identify an explicit references in the descriptors of services 350 and in, response to identifying the references, propagate the modified attribute(s) 365 to the referrer services 350 without causing undue disruption. In the shared storage example, an attribute can be as straightforward as an attribute indicating the percentage of the capacity allocated to each referrer service. Consequently, a modification in the shared storage service triggers one or more additional storage entities to be generated for the referrer services to meet capacity.

Figure 3D:
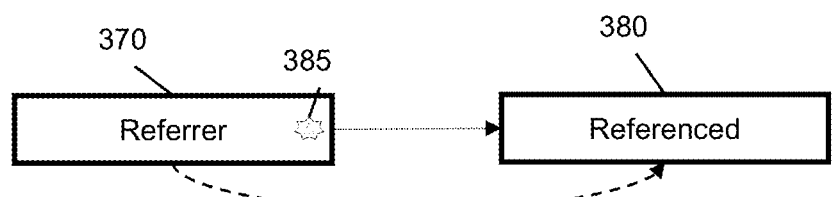
FIG. 3D is a schematic diagram showing a first referenced service and corresponding referrer services according to an example.

FIG. 3D shows a schematic diagram of a service 370 referencing service 380 according to an example. Similarly to the services shown in FIG. 3C, the service 370 shown in FIG. 3D contains a reference 385 to service 380 which was included in the descriptor of service 370. In an example, the reference 385 in the descriptor of service 370 to service 380 includes a specification of one or more parameters relating to service 380 when the service 370 was instantiated. One or more attributes of service 370 may be modified in response to a request received at the command interface 140 or data received via resource interface 170 and in response to those modifications, attribute changes are propagated to the referenced service 380. The propagation in this case is implemented by including one or more referrer parameters in the descriptor of the referenced service 380. The one or more referrer parameters are parameters of the referenced service 380 which depend on parameters of the referrer service 370. Similarly to previously described examples, the referrer parameters can be used by the service controller 150 to re-compute attributes for parameters in response to a modification of an attribute in the referrer service 370 via the resource manager 120.

Figure 4:
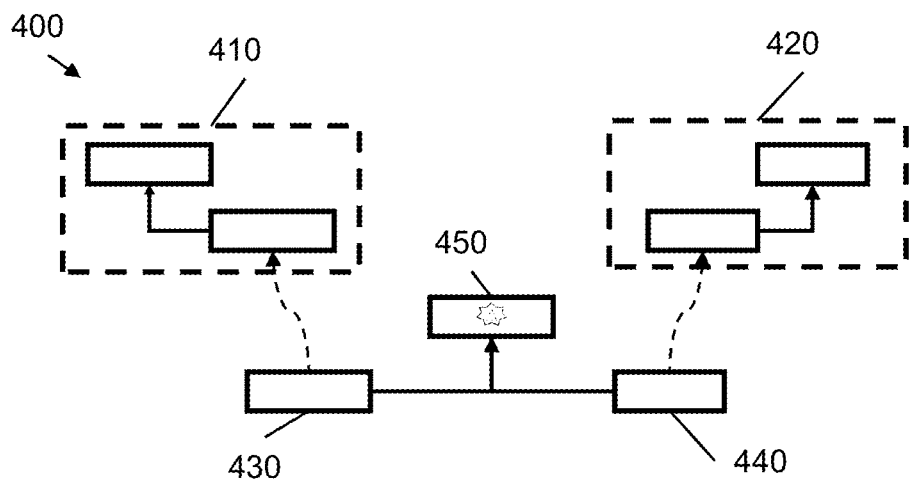
FIG. 4 is a schematic diagram showing a service graph comprising two services using a common shared service.

FIG. 4 shows a schematic diagram of a service graph 400 according to an example. In FIG. 4, a first service 410 and a second service 420 are represented. The dashed boxes around these services indicate that each service was independently instantiated by separate requesting parties. Services 410 and 420 are each referring to services 430 and 440, respectively. In the example shown in FIG. 4, services 430 and 440 are child services of a parent service 450. In one case, services 430 and 450 are generated in response to a user requesting service 410 where the descriptor of service 410 included a reference to child service 430. In particular, when the service 430 was instantiated the parent service 450 was also instantiated.

For example, the requested service 410 could be a virtual private network (VPN) and service 430 a virtual network. In this case, service 450 could represent a virtual network management service. The service 420 could be a second VPN requested by a second user according to a certain configuration. In response to the second user's request, service controller 150 instructed the resource manager 120 to generate a second virtual network 440 as a child service to the virtual network manager service 450. Thus, in this example, the virtual network manager service 450 has become a shared resource to both VPN services 410 and 420. If the party that originally requested service 450 now sends a request to the service engine 110 to modify an attribute of service 450 a number of actions are taken by the service engine to propagate changes through the service graph 400. Firstly, the service controller 150 identifies the child services 430 and 440 in the descriptor of the service 450. Each service 430 and 440 has been configured with its own set of attributes according to the parameters in the descriptor inherited from the parent service 450. The service controller 150 modifies each child service in response to the modifications to the parent service for affected attributes. In response to the modifications to the child services 430 and 440, the service controller 150 identifies any reference parameters in the descriptors of services 410 and 420 and instructs the resource manager 120 to effect modifications to attributes of services 410 and 420. However, following modifications to those services, the service controller 150 identifies any referrer parameters in the child services 430 and 440 and, for any identified parameters, perform additional modifications to the child services 430 and 440 (as per the example described in relation to FIG. 3D). Finally, the service controller 150 identifies any attributes of the parent service 450 which may have been affected as a result of those changes. The original request to modify service 450 has been fulfilled after these operations have been performed.

As the previous example illustrates, in general, the request that is received at the command interface will not necessarily be for a modification to either a referrer or a referred service. Indeed, in general a request to modify a service in the service graph involve the propagation of changes throughout at least a subset of the services represented in the service graph to fulfil the request. A single attribute may have to be changed multiple times throughout the propagation of attribute changes before attribute values stabilize. This may be due to cycles in the service graph causing a knock-on effect. For example, a modification to one service may trigger a modification to a second service which triggers a further modification to a third service, which then triggers another change to the first service and so on.

In an example of the apparatus 100, the service controller 150 is arranged to equate each node in the service graph as a first service and each other node in the service graph as a second service and on the basis of one or more relationships in the descriptors of the respective nodes, propagate a modification to the services in the service graph in response to a modification to a service.

One way of guaranteeing termination of the propagation is to impose an upper bound on the number of evaluations of each node. In other words, the service controller keeps track on the number of passes of each node where a pass comprises an evaluation of the descriptor of the service associated to the node. It should be noted that in very large service graphs, parsing even every node once may be impractical. In such a case, it may be practical to specify a limit on the number of degrees of separation from the node at which the service request was directed towards, for example.

Figure 5:
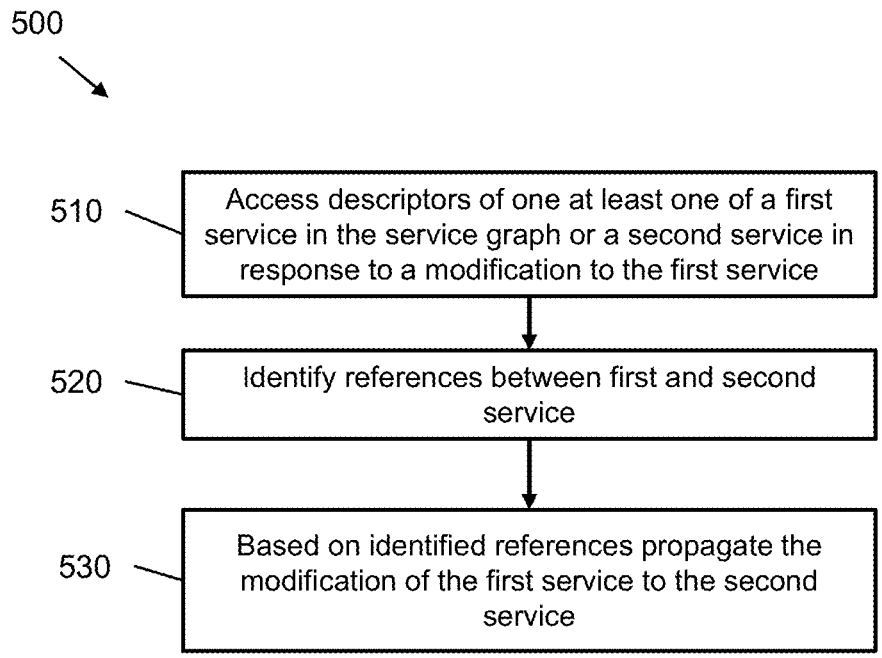
FIG. 5 is a schematic diagram showing a method of propagating a modification to a service graph according to an example.

FIG. 5 shows a method 500 of orchestrating a modification to a service graph according to an example, by the apparatus 100 shown in FIG. 1.

At block 510, in response to the request, descriptors of at least one of a first service in the service graph and a second service are accessed, in response to a modification to the first service. The modification to the first service may comprise a modification of one or more attributes and may be in response to a received request to modify a service in a service graph from a user, for example. In an example, the request to modify a service includes a request to create a service or terminate a service currently running on an. According to an example, an execution of the service comprises instantiating, modifying or deleting one or more of physical and/or virtual computing, storage and networking resources on infrastructure such as the physical and/or virtual infrastructure 130 shown in FIG. 1. The request is received at a command interface such as interface 140 shown in FIG. 1, via a GUI communicatively coupled to the command interface 140. According to another example, descriptors are accessed in response to a modification to one or more attributes of a service due to, for example, a condition being monitored such as service performance, external network conditions or as part of fault monitoring.

In the example shown in FIG. 1, the service controller 150 sends a request to access descriptors. In one case, descriptors are accessed via an interface remotely for example, storage interface 160 providing access to service descriptor data store 180. However, in other cases, access are provided directly via a storage communicatively coupled to a service controller. At block 520, references between the first and second service are identified. As described in relation to FIGS. 3C and 3D, references in the form of reference parameters are provided in descriptors of services. Identifying the reference parameters at block 510 may be performed by service controller 150. In particular, reference parameters in the service descriptor of the first service to the second service and referrer parameters in the second service to the service are identified. At block 530, the modification to attributes of the first service are propagated to attributes of the second service. In the example shown in FIG. 1, the propagation process is carried out by the service controller 150. The service controller 150 can generate instructions to be sent via the resource interface 170 to the resource manager 120, which can then instantiate and/or modify the physical and/or virtual infrastructure to implement the change.

Figure 6:
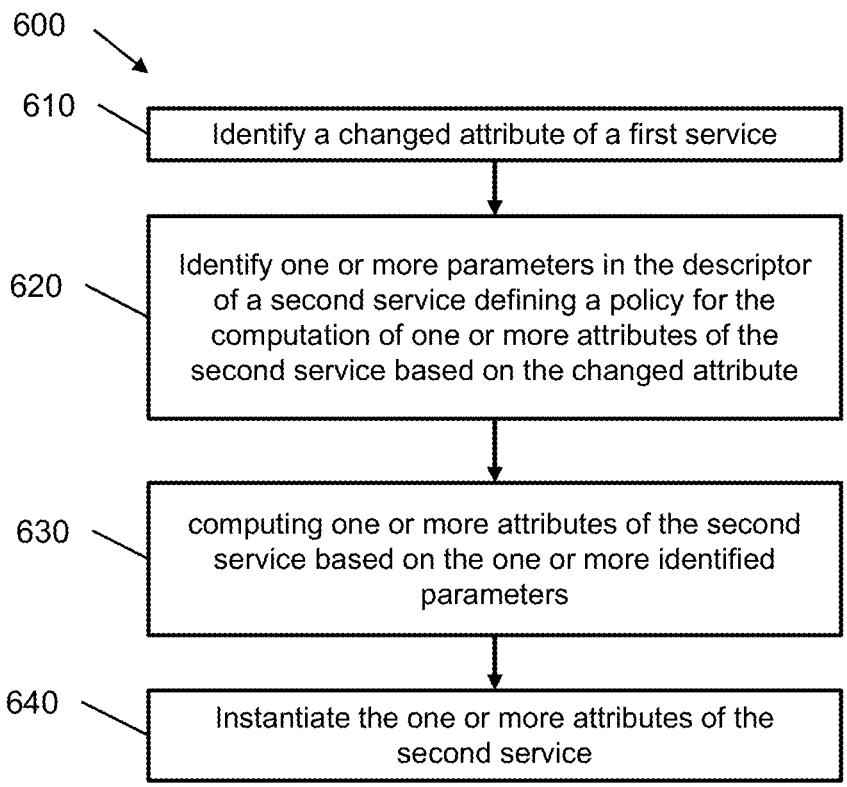
FIG. 6 is a schematic diagram showing a method of modifying a service in a service graph according to an example.

FIG. 6 shows a method 600 according to an example of instantiating a service graph update. The method shown in FIG. 6 may be used in conjunction with the method shown in FIG. 5 to implement a propagation of a changed attribute of a service in a service graph and also is used in conjunction with the apparatus shown in FIGS. 1 and 2. At block 610, a changed attribute of a first service is identified. The changed attribute might be as a direct result of a request, for example, to increase storage. At block 620, one or more parameters in the descriptor of a second service are identified, where the parameters define a policy for the computation of one or more attributes of the second service based on the changed attribute. At block 630, one or more attributes of the second service are computed based on the identified parameters at block 620. At block 640, the second service is instantiated with the modified attributes.

Figure 7:
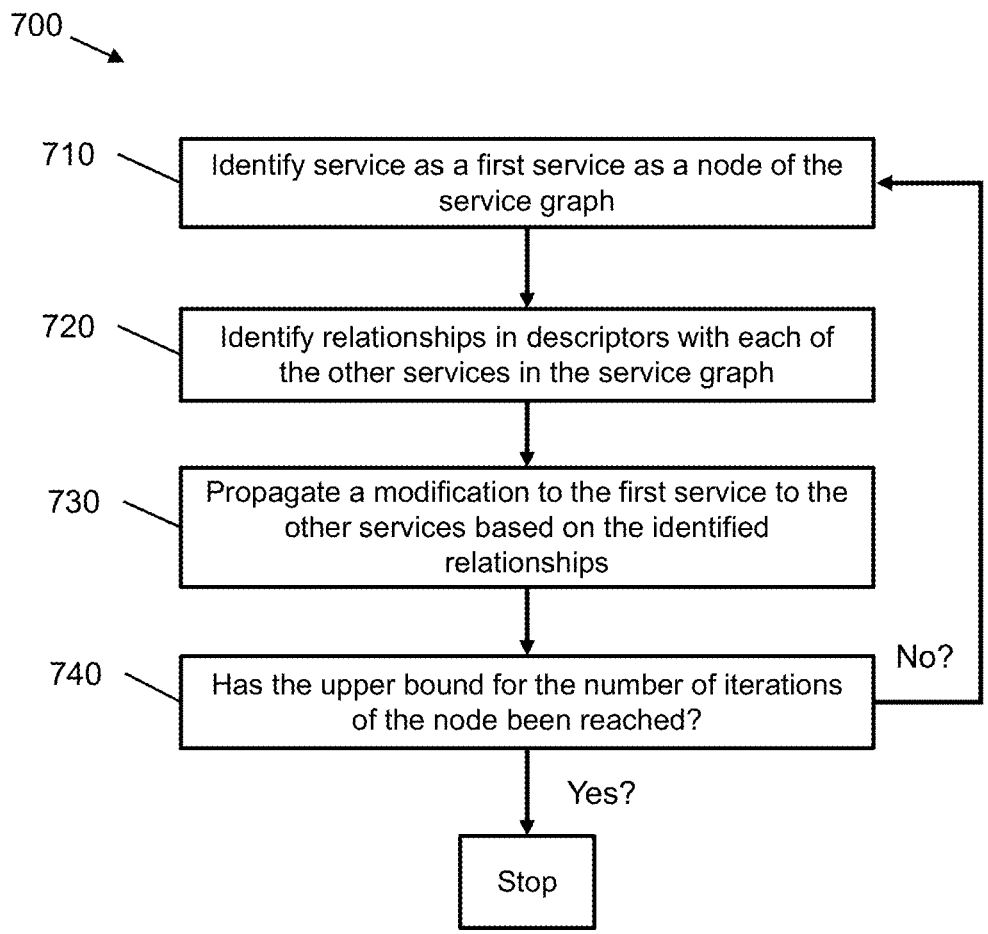
FIG. 7 is a schematic diagram showing a method of iteratively modifying services in a service graph according to an example.

FIG. 7 shows a method 700 according to an example of iteratively propagating a modification to a service in a service graph. The method 700 may be used in conjunction with the previous methods 600 and 600 to propagate one or more modifications to services in a service. The method 700 may be used in conjunction with the apparatus 100 shown in FIG. 1. At block 710, a service is identified as a first service in the service graph. At block 720, one or more relationships in the descriptor of the service with each of the other services are identified. The descriptors contain reference parameters, referrer parameters, child parameters or parameters representing attributes inherited from parent services. At block 730 a modification to the first service is propagated to the other services in the service graph based on the identified relationships.

In one example a request is received for a modification to the service identified as the first service at block 710. In another example, the request is for a modification to a service other than the service identified as the first service. At block 740, a check is performed as to whether an upper bound for a number of iterations of the node representative of the service in the service graph has been reached or whether the node of the service graph representing the service has been reached. According to an example, the upper bound is a pre-determined limit imposed by a systems administrator to guarantee that the propagation algorithm terminates. If the upper bound has not been reached then the method is repeated for that service. In an example the method 700 shown in FIG. 7 is used to ensure that the effects of an attribute change are fully propagated throughout the service graph. The method 700 shown in FIG. 7 is replicated for each service node in the service graph until the upper bound for that node has been reached. Once all changes to the service graph have been propagated, a modification is instantiated. In an example, the order in which the updated parameters are instantiated reflects the dependencies between services. In an example, services are topologically sorted using, for example, an algorithm such as Tarjan's Algorithm. Failure to topologically sort the dependencies between services could result in a misconfiguration of one or more services.

Methods and systems described herein provide a means of general change propagation of attributes of services throughout a service graph. The systems and methods disclosed consider the effects of modifications to services throughput the whole service graph and not just one particular service instance of those services that are referred to. Classical service orchestration technologies depend on service decomposition but these methods and systems considered those services in isolation and not as part of a wider infrastructure.

Figure 8:
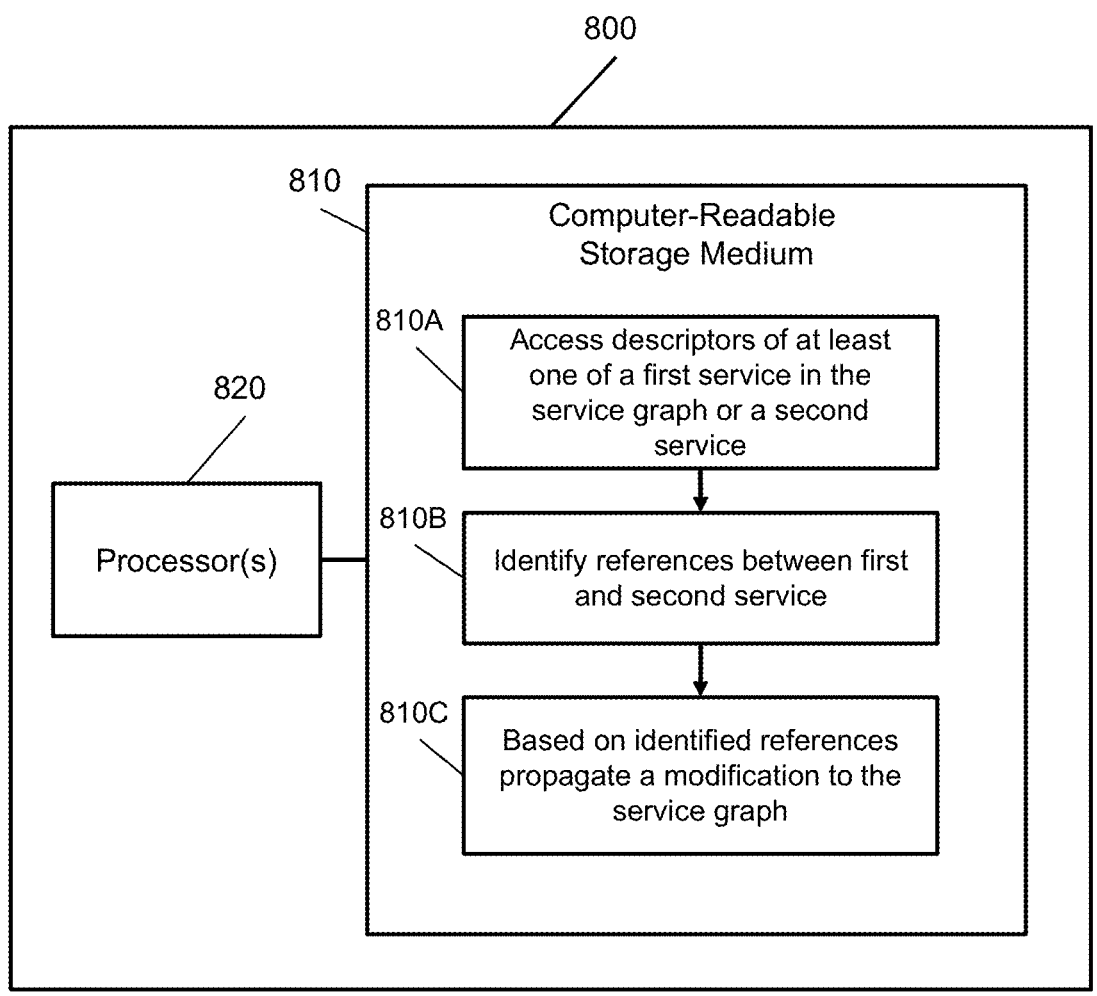
FIG. 8 is a schematic block diagram of a computer system according to an example.

Certain methods and systems as described herein may be implemented by one or more processors that processes program code that is retrieved from a nontransitory storage medium. FIG. 8 shows an example of a device 800 comprising a machine-readable storage medium 810 coupled to at least one processor 820. Machine-readable medium 810 can be any media that can contain, store, or maintain programs and data for use by or in connection with an instruction execution system. Machine-readable medium 810 can comprise any one of many physical media such as, for example, electronic, magnetic, optical, electromagnetic, or semiconductor media. More specific examples of suitable machine-readable medium 810 include, but are not limited to, a hard drive, a random access memory (RAM), a read-only memory (ROM), an erasable programmable read-only memory, or a portable disc. In FIG. 8, the machine-readable storage medium 810 comprises program code to effect a service controller and descriptors as described in the foregoing examples herein. In an example, the device 800 comprises a number of separate, distributed devices communicatively coupled to one another and processors 820 are distributed across the plurality of devices. The machine-readable storage medium 810 contains instructions to be responsive to a modification to a service in a service graph comprising at least a first service. In particular, machine readable storage medium 810 accesses descriptors of one at least one of a first service in the service graph and a second service 810A. The machine-readable storage medium 810 contains instructions to identify one or more relationships in one or more descriptors of at least one of the first service and a second service 810B. Based on the one or more identified relationships, the machine-readable storage medium 810 contains instructions to propagate a modification to services in the service graph 810C.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

The invention claimed is:

1. A method of propagating a modification to a first node in a graph of nodes, the method comprising:
    obtaining the graph, wherein:
        the graph is associated with a service orchestration system,
        the nodes of the graph represent services,
        each of the nodes corresponds with attributes that define at least one configuration setting of an infrastructure component corresponding to a respective one of each of the nodes,
        the nodes of the graph are connected to other nodes through arcs,
        each of the arcs represent a relationship between two of the nodes, and
        executing a change of at least one attribute of at least one node in the graph changes a configuration of the infrastructure component corresponding with the at least one node;

determining a pre-defined service descriptor for the first node in the service orchestration system, wherein the pre-defined service descriptor defines:
first attributes of the first node,
a first rule governing relationships between the first node and other nodes in the graph, and
a second rule governing a process to compute values of one or more of the first attributes in the first node based on values of other attributes in the first node and the attributes in other nodes;
responsive to a modification to a service, accessing the graph that includes a first attribute of the first node in the graph;
computing values of the first attributes of the first node that depend on the values of the first attribute that were modified by a request, wherein the computation of values uses the first rule and the second rule defined in the pre-defined service descriptor;
adjusting the arcs that represent the relationships between the first node and the other nodes in the graph that are changed by the computed values of the first attributes of the first node;
based on determining that the values of the attributes or the arcs that represent the relationships between the first node and the other nodes in the graph have changed from modifying the first node in the graph, identifying a second node in the graph, wherein the second node is represented in a second relationship with the first node;
propagating the changed attribute values to the second node, wherein the propagation comprises:
identifying a second pre-defined descriptor of the second node;
computing values of second attributes of the second node that depend on changed values of the first attributes of the first node and the second attributes of the second node;
adjusting the arcs that represent the relationships between the second node and the other nodes in the graph that are changed by the computed values of the second attributes of the second node; and
repeating the propagation of changed attribute values to other nodes related to the first node or the second node in the graph until an upper bound of iterations has been executed.

2. The method of claim 1, wherein propagating the modification comprises successively equating each node in the graph to the first attributes of the first node and equating each other node to the second node-on the basis of the successive equating.

3. The method of claim 2 wherein implementing the successive equating is in accordance with the upper bound of iterations.

4. The method of claim 1 wherein the modification to the first node in the graph of nodes is as a result of at least one of:
the request,
an upgrade to the service corresponding with the first node,
one or more performance triggers,
one or more fault monitoring triggers,
one or more timing events, and
one or more state-transitions of the service.

5. The method of claim 1, wherein the first node is a child service of a parent service in a parent-child decomposition chain and the second node is the corresponding parent service.

6. The method of claim 1 further comprising:
instantiating a reference parameter in the pre-defined service descriptor of the first node to the second node.

7. The method of claim 1 further comprising:
instantiating a referrer parameter in the pre-defined service descriptor of the second node from the first node.

8. The method of claim 1, the method further comprising:
modifying physical or virtual infrastructure resources comprising one or more of computing, storage, and network resources to implement one or more instances of services in the graph.

9. The method of claim 1, wherein the first node in the graph is associated with a shared service requested by a plurality of service users.

10. An apparatus for use in propagating a modification to a first node in a graph of nodes, the apparatus configured to:
obtain the graph, wherein:
the graph is associated with a service orchestration system,
the nodes of the graph represent services,
each of the nodes corresponds with attributes that define at least one configuration setting of an infrastructure component corresponding to a respective one of each of the nodes,
the nodes of the graph are connected to other nodes through arcs,
each of the arcs represent a relationship between two of the nodes, and
executing a change of at least one attribute of at least one node in the graph changes a configuration of the infrastructure component corresponding with the at least one node;
determine a pre-defined service descriptor for the first node in the service orchestration system, wherein the pre-defined service descriptor defines:
first attributes of the first node,
a first rule governing relationships between the first node and other nodes in the graph, and
a second rule governing a process to compute values of one or more of the first attributes in the first node based on values of other attributes in the first node and the attributes in other nodes;
responsive to a modification to a service, access the graph that includes a first attribute of the first node in the graph;
compute values of the first attributes of the first node that depend on the values of the first attribute that were modified by a request, wherein the computation of values uses the first rule and the second rule defined in the pre-defined service descriptor;
adjust the arcs that represent the relationships between the first node and the other nodes in the graph that are changed by the computed values of the first attributes of the first node;
based on determining that the values of the attributes or the arcs that represent the relationships between the first node and the other nodes in the graph have changed from modifying the first node in the graph, identify a second node in the graph, wherein the second node is represented in a second relationship with the first node;
propagate the changed attribute values to the second node, wherein the propagation comprises:
identifying a second pre-defined descriptor of the second node;

computing values of second attributes of the second node that depend on changed values of the first attributes of the first node and the second attributes of the second node;

adjusting the arcs that represent the relationships between the second node and the other nodes in the graph that are changed by the computed values of the second attributes of the second node; and repeat the propagation of changed attribute values to other nodes related to the first node or the second node in the graph until an upper bound of iterations has been executed.

11. The apparatus of claim 10, wherein a service controller is arranged to equate each node in the graph as the first node and each other node as the second node on the basis of successive equating.

12. The apparatus of claim 10 comprising:
an interface in communication with a service controller; and
a physical or virtual resource manager arranged to send a command from the service controller to instruct an assignment of physical or virtual infrastructure resources to at least one instance to configure the service, the physical or virtual infrastructure resources comprising one or more of physical or virtual computing, storage, and networking resources.

13. The apparatus of claim 10 wherein the modification to the first node in the graph of nodes is initiated by one or more performance triggers.

14. The apparatus of claim 10 further configured to:
instantiate a reference parameter in the pre-defined service descriptor of the first node to the second node.

15. The apparatus of claim 10 comprising:
instantiate a referrer parameter in the pre-defined service descriptor of the second node from the first node.

16. A non-transitory computer-readable storage medium storing instructions that, when executed by one or more processors, cause the one or more processors to propagate a modification to a first node in a graph of nodes by:
obtaining the graph, wherein:
the graph is associated with a service orchestration system,
the nodes of the graph represent services,
each of the nodes corresponds with attributes that define at least one configuration setting of an infrastructure component corresponding to a respective one of each of the nodes,
the nodes of the graph are connected to other nodes through arcs,
each of the arcs represent a relationship between two of the nodes, and
executing a change of at least one attribute of at least one node in the graph changes a configuration of the infrastructure component corresponding with the at least one node;
determining a pre-defined service descriptor for the first node in the service orchestration system, wherein the pre-defined service descriptor defines:
first attributes of the first node,
a first rule governing relationships between the first node and other nodes in the graph, and
a second rule governing a process to compute values of one or more of the first attributes in the first node based on values of other attributes in the first node and the attributes in the other nodes;
responsive to a modification to a service, accessing the graph that includes a first attribute of the first node in the graph;
computing values of the first attributes of the first node that depend on the values of the first attribute that were modified by a request, wherein the computation of values uses the first rule and the second rule defined in the pre-defined service descriptor;
adjusting the arcs that represent the relationships between the first node and the other nodes in the graph that are changed by the computed values of the first attributes of the first node;
based on determining that the values of the attributes or the arcs that represent the relationships between the first node and the other nodes in the graph have changed from modifying the first node in the graph, identifying a second node in the graph, wherein the second node is represented in a second relationship with the first node;
propagating the changed attribute values to the second node, wherein the propagation comprises:
identifying a second pre-defined descriptor of the second node;
computing values of second attributes of the second node that depend on changed values of the first attributes of the first node and the second attributes of the second node;
adjusting the arcs that represent the relationships between the second node and the other nodes in the graph that are changed by the computed values of the second attributes of the second node; and
repeating the propagation of changed attribute values to other nodes related to the first node or the second node in the graph until an upper bound of iterations has been executed.

17. The non-transitory computer-readable storage medium of claim 16 wherein the modification to the first node in the graph of nodes is initiated by one or more performance triggers.

18. The non-transitory computer-readable storage medium of claim 16 further configured cause the one or more processors to propagate the modification to the first node in the graph of nodes by:
instantiating a reference parameter in the pre-defined service descriptor of the first node to the second node.

19. The non-transitory computer-readable storage medium of claim 16 further configured cause the one or more processors to propagate the modification to the first node in the graph of nodes by:
instantiating a referrer parameter in the pre-defined service descriptor of the second node from the first node.

* * * * *